United States Patent
Waslowski et al.

(10) Patent No.: US 7,656,541 B2
(45) Date of Patent: Feb. 2, 2010

(54) OPTOELECTRONIC APPARATUS AND A METHOD FOR ITS OPERATION

(75) Inventors: Kai Waslowski, Emmendingen (DE); Gerhard Merettig, Sexau (DE)

(73) Assignee: Sick AG, Waldkirch/Breisgau (DE)

( * ) Notice: Subject to any disclaimer, the term of this patent is extended or adjusted under 35 U.S.C. 154(b) by 269 days.

(21) Appl. No.: 11/708,164

(22) Filed: Feb. 19, 2007

(65) Prior Publication Data

US 2008/0130005 A1 Jun. 5, 2008

(30) Foreign Application Priority Data

Feb. 20, 2006 (DE) .................. 10 2006 007 764

(51) Int. Cl.
*G01B 11/14* (2006.01)

(52) U.S. Cl. ...................................... 356/623

(58) Field of Classification Search ......... 356/614–624, 356/237.1–237.5
See application file for complete search history.

(56) References Cited

U.S. PATENT DOCUMENTS

| | | | | | |
|---|---|---|---|---|---|
| 2,216,716 | A | * | 10/1940 | Withem | 356/3.05 |
| 4,470,681 | A | * | 9/1984 | Johnson | 396/123 |
| 4,721,384 | A | * | 1/1988 | Dietrich et al. | 356/3.03 |
| 4,740,806 | A | * | 4/1988 | Takehana | 396/123 |
| 5,076,687 | A | * | 12/1991 | Adelson | 356/4.04 |
| 5,848,305 | A | * | 12/1998 | Takasaki | 396/96 |
| 6,392,755 | B1 | | 5/2002 | Levecq et al. | |
| 6,862,098 | B1 | * | 3/2005 | Tanuma et al. | 356/623 |
| 7,102,730 | B2 | * | 9/2006 | Takada | 355/53 |
| 2004/0189970 | A1 | * | 9/2004 | Takada | 355/67 |
| 2009/0147239 | A1 | * | 6/2009 | Zhu et al. | 356/3.12 |

FOREIGN PATENT DOCUMENTS

| | | |
|---|---|---|
| DE | 101 17 147 | 10/2002 |
| DE | 10231178 | 2/2004 |
| DE | 103 21 888 | 12/2004 |
| DE | 102004009484 | 5/2005 |
| DE | 10 2004 003 013 | 6/2005 |
| DE | 10 335 263 | 8/2005 |
| DE | 10 2004 038 940 | 2/2006 |
| EP | 0 470 420 | 5/1994 |
| EP | 0 444 135 | 10/1997 |
| EP | 1111332 | 6/2001 |
| EP | 0 647 326 | 6/2002 |
| EP | 0 859 992 | 7/2003 |
| FR | 2 761 151 | 3/1997 |
| WO | 2005/047955 | 5/2005 |

* cited by examiner

*Primary Examiner*—Tarifur R. Chowdhury
*Assistant Examiner*—Isiaka O Akanbi
(74) *Attorney, Agent, or Firm*—Harness, Dickey & Pierce, P.L.C.

(57) ABSTRACT

An apparatus detects an object using an optoelectronic apparatus. Light beams generated by a light source are scattered back and/or reflected by an object and are detected by a receiver arrangement in accordance with the triangulation principle. An object detection signal is output by an evaluation unit and the light beams in the receiver arrangement act via an optical receiver system and a microlens array on a pixel array comprising photodetectors. A macropixel has a plurality of subpixels associated with each microlens. The evaluation unit comprises a unit for determining the received signal distribution over the subpixels. Methods for operating the apparatus are also provided.

25 Claims, 4 Drawing Sheets

OPTOELECTRONIC APPARATUS AND A METHOD FOR ITS OPERATION

CROSS-REFERENCE TO RELATED APPLICATIONS

This application claims the benefit of German Patent Application No. 10 2006 007 764.4, filed Feb. 20, 2006. The disclosure of the above application is incorporated herein by reference.

FIELD

The present invention relates to an optoelectronic apparatus for the detection of an object by means of a light sensor, wherein light beams generated by a light source and scattered back and/or reflected from an object are detected by a receiver arrangement in accordance with the triangulation principle and an object detection signal is output. The present invention furthermore relates to a method for the operation of such an apparatus.

BACKGROUND

The statements in this section merely provide background information related to the present disclosure and may not constitute prior art.

The functional principle of a triangulation light sensor is based on the fact that light beams transmitted by a light source are scattered back onto a receiver by an object which has moved into its beam path, with the angle at which the light beams scattered back are incident on the receiver being a measure for the distance between the light sensor and the object. A triangulation light sensor with a circuit output generates an object determination signal when an object is located within a predetermined scanning range. A spacing-measuring triangulation light sensor can measure the distance between the light sensor and an object and deliver an output signal proportional to the distance.

The light source, which can additionally be provided with an optical transmitter system, emits an ideally parallel bundle of rays which generates a light spot when incident onto the surface of an object which is scattered back by the object. This light spot is imaged into a receiver plane via an optical receiver system arranged laterally offset to the light source, with the imaging as a rule taking place in a blurred manner since the receiver plane is usually not in the image plane. The beams scattered back by the object pass through the optical receiver system at different angles in dependence on the distance of the object from the optical receiver system and are thus also incident onto different lateral positions in the receiver plane. The spacing of the object from the light sensor can be determined from the spacing of the light spot imaged onto the receiver from a reference point by means of triangulation with knowledge of the spacing between the optical receiver system and the receiver plane as well as of the location and direction of the bundle of rays transmitted by the light source.

With an ideal triangulation light sensor, the optical receiver system is formed by an infinitely small aperture since a detection of the spacing independently of interference influences is only thereby ensured. With a real triangulation light sensor, an optical receiver system is used with an aperture whose minimal size is predetermined by the limited sensitivity of the receiver and by the signal-to-noise ratio of the total system.

With a real light sensor of this type, however, the measurement result can be falsified if only a portion of the optical receiver system is illuminated in an asymmetric manner. This can occur, for example, in that the light pencil transmitted by the light source is incident on a contrast border present in the surface of the object, with the contrast border separating regions with very high backscattering capability and regions with very low backscattering capability from one another. The measured light spot focus is thereby displaced in an unwanted manner with respect to the anticipated light spot focus in the receiver plane.

Furthermore, only objects with ideally scattering surfaces can be detected really reliably by triangulation light sensors, i.e. the object should scatter back an incident light beam uniformly diffusely at a specific spatial angle. Real surfaces are, however, rarely exclusively light scattering; as a rule, at least some of the incident light is reflected.

A light beam reflected by the object as a rule only partly illuminates the optical receiver system in contrast to a light beam scattered back. If the reflected bundle of rays is not incident on the optical receiver system in the region of the optical axis, a light spot is generated by the reflected beams whose position differs from the position of the beams scattered back. Since the reflected beams as a rule have a higher intensity than the beams scattered back, a false detection can occur in dependence on the angle of the object surface to the transmission direction of the light beams transmitted by the light source.

SUMMARY

It is therefore the object of the present invention to provide an apparatus for the more reliable detection of an object and a method for the operation of such an apparatus.

The object of the invention is satisfied by an optoelectronic apparatus for the detection of an object in accordance with the triangulation principle comprising a light source, a receiver arrangement for the detection of light beams scattered back and/or reflected from an object and an evaluation device, wherein the receiver arrangement has an optical receiver system for the deflection of the light beams scattered back and/or reflected from the object, a microlens array downstream of the optical receiver system and also a pixel array comprising photodetectors, with a macropixel having a plurality of subpixels being associated with each microlens; and in that the evaluation unit includes a unit for the determination of the received signal distribution via the subpixels within a macropixel.

With respect to conventional triangulation light sensors, an object detection signal cannot only be determined from the position of a light spot on the receiver generated by the detected object using the arrangement in accordance with the invention. It is rather possible to gain spacing information from the received signal distribution within one or more macropixels. Thanks to the microlens array, the information on the carrying out of a triangulation can namely not only be gained in the absolute position of a light spot image on the receiver, but also from the additional information present in each illuminated macropixel on the angle of incidence of the received beams onto the receiver arrangement and/or on asymmetries in the illumination of the optical receiver system, as will be explained in more detail in the following.

Possibilities thus arise by the apparatus in accordance with the invention to avoid the initially described artifacts which can falsify the result of the object detection and/or to quantify them and, optionally, to use them for a correction of the result.

In an advantageous embodiment, the pixel array can be linear. This arrangement represents a cost-effective solution when only a lower detection precision or detection sensitivity is needed.

In a likewise preferred embodiment, the pixel array can have the form of a two-dimensional array. Asymmetries in a second lateral direction can also be demonstrated with a two-dimensional array in comparison with a linear pixel area.

The pixel array can preferably be a CCD sensor, a CMOS sensor or an arrangement of PIN diodes.

It is advantageous when the light source is a laser or an LED. When a laser is used, no additional optical transmitter systems have to be provided as a rule. Furthermore, lasers or LEDS are available which emit light in the infrared range so that light sensors can thereby be realized which are largely insensitive with respect to any visible interfering light.

In accordance with a preferred embodiment of the invention, the focal lengths and/or the apertures of the optical receiver system and of the microlenses are selected such that at least the light beams which are scattered back from an object arranged within a detection zone and which fully illuminate the optical receiver system can be deflected by a plurality of adjacent microlenses and can each be focused or deflected within the macropixels associated with these microlenses onto a partial region of the respective macropixel in particular including a plurality of individual subpixels. The term "focus" in the sense of this invention is generally also to be understood as a pure deflection of light beams without an exact focusing on a point.

In this embodiment, the focal lengths and/or the apertures are therefore dimensioned such that a light spot produced on the object by the light sources is imaged approximately only on a respective part region of the respective macropixels which ideally includes one to three subpixels so that information on the angle of incidence of the received beams on the receiver arrangement is also given in the position of the subpixel or subpixels acted on by the focused received rays or in the position of a characteristic of the received signal distribution within the respective macropixels.

It must be noted in this respect that an exact imaging on an individual subpixel of a macropixel is only given for a specific spacing of the object from the receiver arrangement. A larger or smaller spacing will result in a certain blurring of the imaging of the light spot due to the limited depth of field, with, however, a position of the imaging of the light spot or of its focus within the macropixel always being able to be determined.

A corresponding spacing value is preferably associated respectively with a subpixel or with the position of a characteristic of the received signal distribution over the subpixels of a macropixel which subpixel or position can be acted on by light beams scattered back and/or reflected from an object arranged at a predetermined spacing. It is accordingly possible to draw a conclusion on an object located at the associated spacing from the action of light on a specific subpixel or from the position of the characteristic of the said received signal distribution.

It is advantageous for in each case a plurality of subpixels of the pixel array with which the same spacing value is associated to be combined to form a metapixel and/or for in each case a plurality of subpixels of the pixel array with which the same spacing range is associated to be combined to form a metapixel.

A metapixel of this type is thus always excited when light from an object located at a corresponding spacing or spacing range is incident onto the receiver arrangement. A metapixel is also excited when only some of the subpixels associated with this metapixel are acted on, i.e. e.g. when the object does not have an ideally back-scattering surface.

It is furthermore advantageous for a plurality of metapixels to be provided with which respectively different spacing values and/or spacing regions are associated. Objects located in different regions can thus also be detected by the evaluation of the metapixels.

In accordance with a preferred embodiment, the subpixels are fixedly interconnected.

Alternatively, the subpixels can be interconnected in a changeable manner. For example, it is possible with a changeable interconnection to be able to carry out the measuring of the spacing regions in dependence on the specific application situation.

The object of the invention is furthermore satisfied by a method for the operation of the apparatus in accordance with any one of the claims 1 to 9 which represents a first method variant and is characterized in that the object detection signal is generated in dependence on the received signal distribution over the macropixels and/or in dependence on the received signal distribution over the subpixels of at least one macropixel and/or in dependence on the received signal distribution over the metapixels.

It is therefore possible in accordance with the invention to use both a signal distribution over the macropixels for the object detection, which basically corresponds to a conventional triangulation light sensor, and to take account of the received signal distribution over subpixels of a macropixel and/or the received signal distribution over the metapixels. The advantages are therefore to be found in evaluating the different received signal distributions individually or in combination with one another as required.

In accordance with an advantageous embodiment variant of the invention, an object detection signal determined in dependence on the received signal distribution over the macropixels is corrected on the basis of the received signal distribution over the subpixels of at least one macropixel.

In this variant, the received signal distribution is first determined over the macropixels and the spacing of the object is determined therefrom. Additionally, a determination takes place of the received signal distribution over the subpixels of one or more macropixels from which a spacing value is likewise determined, optionally by averaging over a plurality of spacing values. The macropixel having the highest intensity can in particular be taken into account exclusively or with a higher weighting in the spacing determination over the subpixels. If both evaluations do not result in the same spacing value, the spacing value determined from the received signal distribution over the macropixels can be replaced by the spacing value determined from the received signal distribution over the subpixels of at least on macropixel, said spacing value in this case being more correct with a high probability.

In a further embodiment variant of the invention, an object detection signal determined in dependence on the received signal distribution over the macropixels is corrected on the basis of the received signal distribution over the metapixels.

In this variant, the received signal distribution is also first determined over the macropixels and the spacing of the object is determined therefrom. In addition, there is a determination of the received signal distribution over the metapixels from which a further spacing value is determined. In a similar manner to the variant described above, the spacing value determined from the received signal distribution over the macropixels can be replaced by the spacing value determined from the received signal distribution over the metapixels if both evaluations do not result in the same spacing value.

In the two aforesaid method variants, an object detection signal can therefore first be determined on the basis of the received signal distribution over the macropixels and can optionally be corrected while taking account of the received signal distribution over the subpixels and/or the metapixels. An incorrect determination caused, for example, by a non-uniform illumination of the optical receiver system can thereby be avoided by balancing with the received signal distribution over the subpixels and/or the metapixels.

In accordance with an advantageous further development of the invention, the object detection signal is only generated in dependence on the received signal distribution over a plurality of metapixels used for the object detection. In this method variant, the determination of the received signal distribution over the macropixels and over the subpixels of at least one macropixel is therefore dispensed with and only the received signal distribution over the metapixels is taken into account.

It is equally possible for the object detection signal only to be generated in dependence on the received signal distribution via the subpixels of the macropixels. In this method variant, the determination of the received signal distribution over the macropixels and over the metapixels is therefore dispensed with and only the received signal distribution over the subpixels is taken into account.

The object detection signal is preferably generated and/or corrected in dependence on the position of a characteristic of the received signal distribution.

The pure determination of the position of the focus or of the maximum of the received signal within the metapixels, the macropixels or the subpixels of a macropixel is generally also already understood as the received signal distribution in the sense of this invention in all invention variants.

In an advantageous method variant, the object detection signal is generated as a binary output signal on the basis of an object located within a predetermined scanning range. A switching triangulation light scanner is hereby realized.

In an advantageous further development of this method variant, the binary output signal is a function of the position of a characteristic of the received signal distribution over the metapixels. The received signal distribution is therefore first determined over the metapixels and subsequently a decision is made on the basis of the position of the characteristic of this distribution as to which of the two output signal states of the binary output signal is to be output.

Alternatively, two spacings and/or spacing regions complementary to one another can be associated in each case with one of two metapixels, with the then only binary output signal adopting a state in dependence on the metapixel acted on the most strongly in each case. In this variant of a switching light sensor, a simple generation of the output signal with short switching times is possible.

In accordance with a further advantageous further development of the invention, the object detection signal is generated as an analog and/or digital spacing signal which is a measure for the spacing of the object from the receiver arrangement and/or from the light source and is a function of the position of a characteristic of the received signal distribution. This arrangement represents a measuring triangulation light scanner.

The object of the invention is furthermore satisfied by method for the operation of the apparatus in accordance with any one of the claims 1 to 9, which represents a second method variant and is characterized in that the received signals delivered from a macropixel are used for the object detection when the subpixels of the respective macropixel have a substantially symmetrical signal distribution; and in that the received signals delivered from a macropixel are not used for the object detection or are only used for the object detection after the carrying out of a correction step when the subpixels of the respective macropixel have a substantially asymmetric signal distribution.

A symmetrical signal distribution is to be understood as a received signal distribution symmetrical with respect to a symmetry axis, with the symmetry axis being able to extend both centrally and off-center with respect to the respective macropixel.

In the named method, an asymmetry created, for example, by detection of reflected light beams can therefore be recognized since the subpixels within a macropixel only have a symmetric signal distribution when the receiver arrangement or its aperture is illuminated substantially homogeneously, which then results in an illumination of a region of the pixel array which has at least the extent of a macropixel.

If, for example, only a marginal region of the aperture of the receiver arrangement is illuminated or if this marginal region is illuminated more pronouncedly than the remaining aperture, the signal distribution within a macropixel has an asymmetry, i.e. specific marginal regions of a macropixel are illuminated more pronouncedly e.g. with respect to other marginal regions.

In accordance with the invention, only macropixels with a substantially symmetrical signal distribution across the individual subpixels are therefore accordingly used. Signals from macropixels in which, e.g. as a consequence of unwanted reflections, an asymmetric signal distribution was found across the subpixels are either not taken into account at all or are taken into account after a correction in accordance with the level of the asymmetry found in the evaluation. It is achieved in this manner that only such "valid" macropixels are taken into account within the framework of the evaluation of the received light signals which are either illuminated to a very substantial degree over scattering object surfaces or whose signals were corrected in a suitable manner. A correction process of this type will be described in more detail in the following.

The finding of a "valid" macropixel can also take place in that the determined received signal distribution over the subpixels of a macropixel is compared with a previously stored reference signal distribution over the subpixels of this macropixel which is adopted with predetermined spacings. The reference signal distribution can both be calculated and be determined during a learning process.

An invalid macropixel is present when, on the comparison with the reference signal distribution associated with this macropixel, a sufficiently large variance is found, lying above a given threshold value, for example.

In a preferred variant of the method, the object detection signal can be determined on the basis of a signal distribution over a plurality of "valid" macropixels used for the object detection, with a signal of a respective "valid" micropixel being determined via summing over its subpixels. After therefore a decision on the macropixels to be taken into account and thus "valid" has been made, a signal distribution is determined via the sum signals of these macropixels.

The object detection signal can preferably be generated from the position of a characteristic of the signal distribution within the pixel array, with the signal distribution being determined from a plurality of "valid" macropixels used for the object detection The spacing of the object from the apparatus in accordance with the invention can be determined from the spacing of the characteristic of the signal distribution from a reference point.

It is advantageous for the object detection signal to be generated in dependence on the position of the geometrical focus or of the maximum of the signal distribution.

On recognition of an asymmetric signal distribution within a macropixel, a correction can take place over the macropixels, e.g. by a corrected determination of the focus of the signal distribution, alternatively to not taking account of such macropixels.

A macropixel having an asymmetric signal distribution is weighted by a corrected spatial coordinate for the calculation of the corrected focus, with the difference between the original spatial coordinate and the corrected spatial coordinate being proportional to the asymmetry-induced displacement of the focus of the signal distribution over the subpixels of this macropixel. The proportionality factor can be determined for each pixel either experimentally or from the geometrical relationships of the light sensor arrangement. The values determined can be stored in a table and used for the calculation of the corrected spatial coordinates in the operation of the light sensor.

Generally, the focus p of the signal distribution is calculated over the macropixels as the sum over all sum signals $S_i$ of each macropixel (sums of the signals of all subpixels of a macropixel) multiplied by the corresponding macropixel coordinate $x_i$ divided by the sum over all sum signals $S_i$, wherein the sum signal $S_i$ is formed as the sum over the signals of all subpixels belonging to a macropixel i. The correction is carried out in the following manner:

The focus $q_i$ of the signal distribution within a macropixel i is calculated in a corresponding manner. A displacement factor $v_i$, which can adopt values between −1 and +1, is determined by norming to the number m of the subpixels within a macropixel. When a symmetrical signal distribution is present in a macropixel, $v_i$ is accordingly equal to 0.

Furthermore, a correction value $DX_i$ is determined for each macropixel i and indicates by how many pixel positions the position of a light spot generated by reflected light beams differs by a maximum from the position of a light spot generated by light beams scattered back when both light beams start from the same location.

The correction value $DX_i$ can be determined experimentally, for example, in that first the position $p_i$ of the light spot generated by an object scattering back is determined and subsequently the backscattering object is replaced by a reflecting object arranged at the same location. Its angular alignment is varied such that the reflected light beams pass through the receiver aperture in a marginal region. The associated new position $pu_i$ of the focus of the light spot is determined accordingly.

The associated displacement factor $v(pu)_i$ is now determined analogously to the determination of the displacement factor $v_i$ from the signal distribution within the macropixel onto which the new position $pu_i$ is now incident. The correction value $DX_i$ is calculated from the difference between $pu_i$ and $p_i$ divided by $v(pu)_i$.

The correction values $DX_i$ are tabled for all macropixels i. It is sensible due to the asymmetric imaging geometry of a triangulation light sensor to determine $DX_i$ in each case separately for the one marginal region and a marginal region of the receiver aperture disposed opposite it, i.e. for positive and negative signs of $v_i$.

In addition to the method described here, a calculation of $DX_i$ is also possible in accordance with the rules of geometrical optics or by computer-assisted simulation.

In operation, in the presence of an asymmetric signal distribution, a corrected pixel coordinate $x'_i$, which is produced from $x_i$ by addition of the product of the correction value $DX_i$ read off from the table and the correction factor $v_i$, is used instead of the pixel coordinate $x_i$ for the determination of a corrected focus p' analog to the above-described calculation.

Furthermore, the object detection signal can preferably be generated as a binary output signal on the basis of an object located within a predetermined scanning range, with the output signal being a function of the position of a characteristic of the signal distribution within the pixel array. In this connection, a specific signal condition is e.g. output when the object is located at a specific spacing or within a predetermined spacing range from the light sensor. If no object is located within the predetermined spacing, the signal condition complementary thereto is output.

In an advantageous variant, the object detection signal can be generated as an analog and/or digital spacing signal based on a detected object, with the magnitude of the spacing signal being a measure for the spacing of the object from the receiver arrangement and/or the light source and being a function of the position of a characteristic of the signal distribution within the pixel array. A method of this type is therefore suitable for the spacing measurement since the output detection signal contains information on the spacing.

It is preferred, on the recognition of at least one macropixel with a substantially asymmetric signal processing over the subpixels, for the object detection signal to maintain its last value directly before this recognition so that in this case no updating of the object detection signal therefore takes place. It is thereby achieved that a short-term detection of reflected light beams does not result in an erroneous object detection signal.

Further preferred embodiments of the invention can be seen from the dependent claims, from the description and from the drawings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
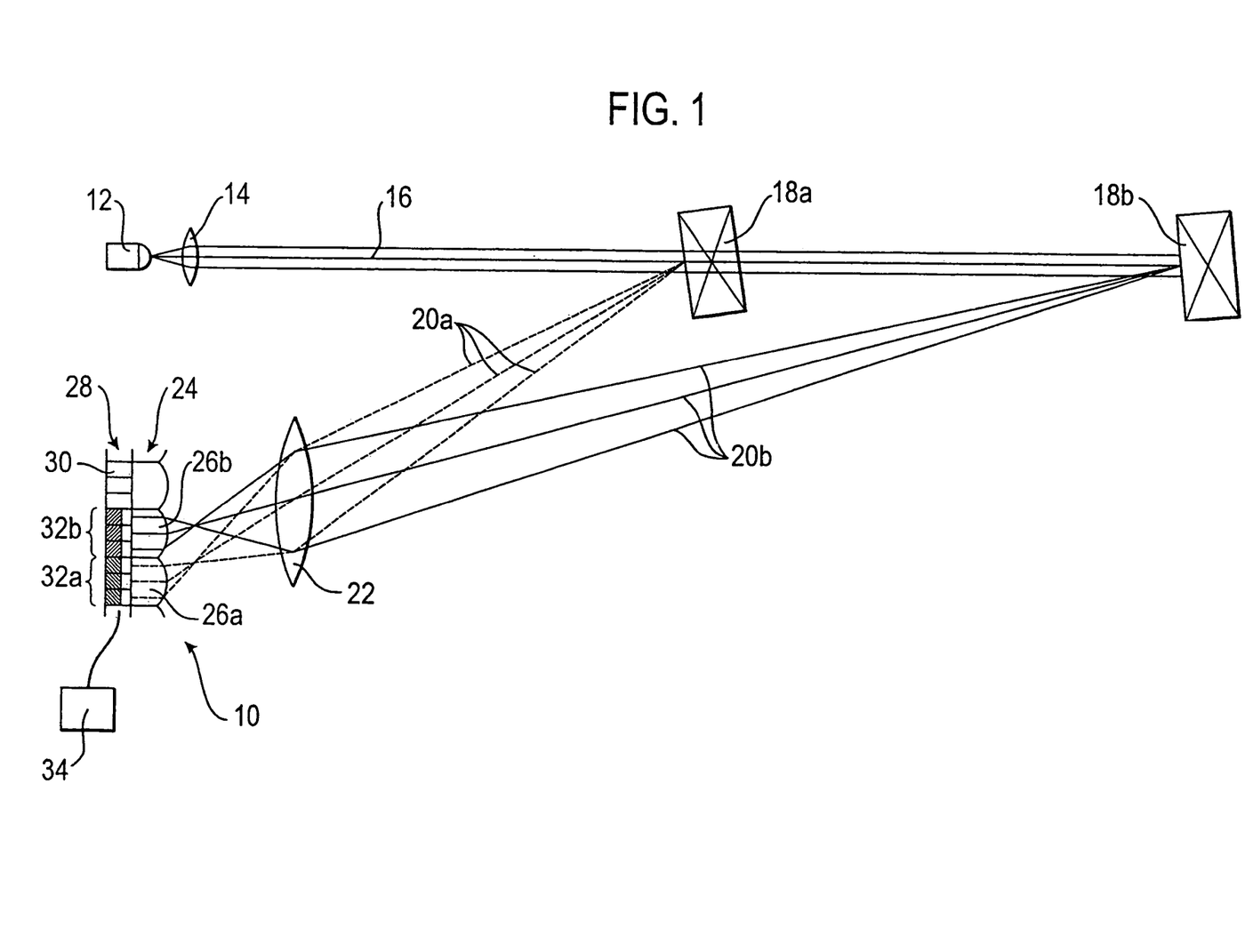
FIG. 1 is a schematic representation of a triangulation light sensor working in accordance with the second method variant with an exclusively backscattering object at two different spacings.
Figure 2:
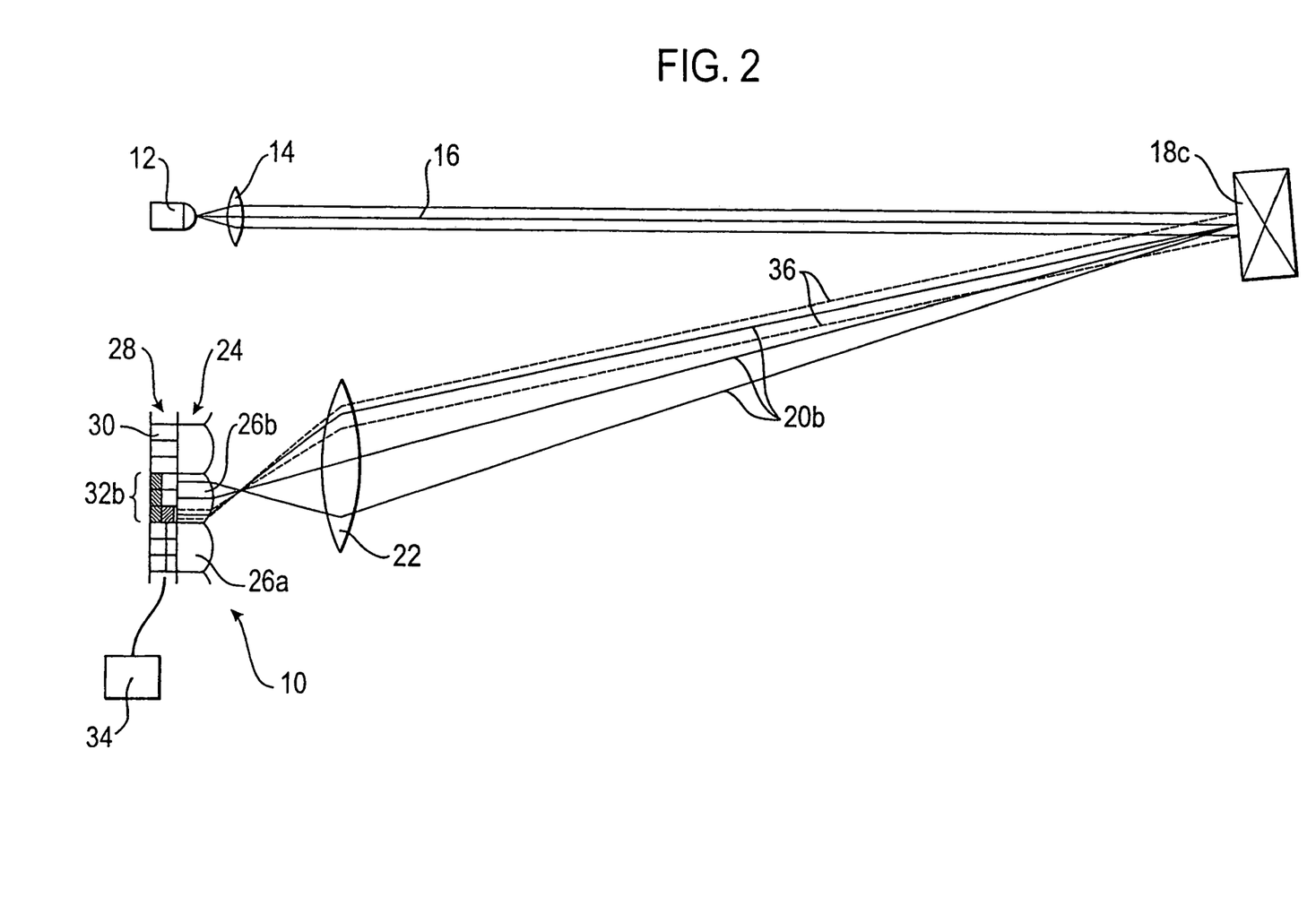
FIG. 2 is a schematic representation of a triangulation light sensor working in accordance with the second method variant with a both backscattering and a reflecting object.

First, with reference to FIGS. 1 and 2, the method in accordance with claims 19 to 24 (second method variant) are explained, with the generally shown apparatus arrangement also being able to be used for the method in accordance with the claims 10 to 18 (first method variant).

FIG. 1 schematically shows a triangulation light sensor 10 whose individual components are not shown in scale and are partly only shown sectionally for the better understanding of the function. The components can be arranged separately or be combined in a common housing not shown in the Figure.

A light source 12 emits divergent light beams which are deflected by means of an optical transmitter system 14 to form an approximately parallel bundle of rays 16.

They are incident on a first object 18a and are scattered back by it. The beams 20a shown by way of example by means of dashed lines in FIG. 1 and scattered back from a point on the surface of the object 18a at a spatial angle are incident on an optical receiver system 22 arranged laterally offset with respect to the light source 12 and are incident in a bundled manner onto a microlens array 24 which is only shown sectionally here and which is spaced somewhat further apart from the optical receiver system 22 than the picture element associated with the beam path shown.

The image spot created in this manner approximately illuminates a first microlens 26a of the microlens array 24 which in turn deflects the beams 20a scattered back onto a receiver 28 which is arranged directly behind the microlens array 24 and which is likewise only shown sectionally. The receiver 28 consists of a pixel arrangement which has a plurality of subpixels 30, with three adjacent subpixels 30 each being combined to form a macropixel 32a, 32b.

The macropixel 32a is associated with the microlens 26a and can receive the beams deflected by it. The macropixel 32b is accordingly associated with the adjacent microlens 26b. The beams 20a scattered back generate a signal in the subpixels 30 of the macropixel 32a whose level is indicated by the size of the hatched areas in the subpixels 30.

When the first object 18a is removed, the bundle of rays 16 transmitted by the light source 12 is incident onto a second object 18b and generates scattered back beams 20b which are shown as solid lines and which are likewise incident on the optical receiver system 22. However, due to the different spacing of the two objects 18a, 18b, they are incident on the optical receiver system 22 at a different angle and therefore on a second microlens 26b adjacent to the first microlens 26a. Said second microlens deflects the beams 20b scattered back onto a second macropixel 32b adjacent to the first macropixel 32a.

A symmetrical illumination of the subpixels 30 of the macropixels 32a or 32b results due to the light scattering properties of the surfaces of the objects 18a, 18b on a backscattering by both the first and the second objects 18a, 18b, which is illustrated in accordance with FIG. 1 by the sizes of the hatched areas of the respective subpixels 30 which are equal with respect to one another.

The arrangement shown in FIG. 2 substantially corresponds to that of FIG. 1, with an object 18c being located at the position of the object 18b shown in FIG. 1 whose surface not only scatters back, but also reflects the bundle of rays 16.

The scattered back beams 20c shown as a solid line are deflected as in FIG. 1 by the optical receiver system 22 and the microlens 26b onto the macropixel 32b and result in a symmetric illumination of the subpixels 30 of the macropixel 32b.

The beams 36 reflected by the object 18c are shown as dashed lines in FIG. 2 and propagate, in contrast to the scattered back rays 20c, under the assumption of a largely planar object surface as a parallel bundle of rays whose diameter corresponds to that of the incident bundle of rays 16.

Since the optical receiver system 22 is not illuminated over its total surface by the lower diameter of the reflected bundle of rays 36, the reflected beams are only received by one single subpixel of the macropixel 32b. The signal distribution which results in sum and is accordingly asymmetric is in turn shown by means of hatching in the subpixels 30 of the receiver 28.

It should be noted at this point that the reflected beams as a rule have a higher beam density than the beams scattered back in dependence on the specific surface properties of the object 18c since they are usually deflected at a much smaller spatial angle so that unrecognized interference due to such reflected beams would have a particularly disadvantageous effect.

In an evaluation unit 34 connected to the receiver 28, the signals of all subpixels 30 are now evaluated with a triangulation light sensor 10 in accordance with the invention. The detection of an asymmetric signal distribution within the macropixel 32b (FIG. 2) can be taken into account in different manners by an evaluation algorithm:

a) The total signal distribution over the macropixels is evaluated as invalid. An object detection signal already output by the evaluation unit 34 prior to the recognition of the asymmetric signal distribution is not updated in this case. Only when asymmetry is no longer found inside the individual macropixels 32 is an updated object detection signal output.

b) An updated object detection signal is output, but the macropixels at which an asymmetry is recognized via the signals delivered by the respective subpixels 30 is not taken into account in the calculation of the position of the light spot focus on the receiver 28.

c) When corresponding algorithms are used, the signals of those macropixels in which an asymmetry was recognized can be corrected by a correction factor proportional to the asymmetry.

In the evaluation unit 34, a sum signal is now formed for each of the macropixels 32 in the circumstances in accordance with FIG. 1, with all macropixels 32 being used for the evaluation since their subpixels 30 each represent a symmetric signal distribution within the macropixels 32. The signal distribution over the macropixels 32 resulting therefrom corresponds to a reduced image of the light spot generated on the object 18a, 18b by the bundle of rays 16. The lateral position of the focus of the signal distribution within the receiver 28 is a measure for the spacing between the object 18a or 18b and the triangulation light sensor 10.

Subsequently, a corresponding object detection signal is output by the evaluation unit. With a triangulation light sensor having a switch output, this can be a binary signal when an object is within a predetermined scanning range. With a measuring triangulation light sensor, a digital or analog signal corresponding to the measured distance is output.

Under circumstances in accordance with FIG. 2, an asymmetric signal distribution is found with respect to the macropixel 32b so that no updating of the object detection signal takes place and the next updating is postponed until all macropixels 32 of the receiver 28 again deliver a symmetrical signal distribution.

Figure 3A:
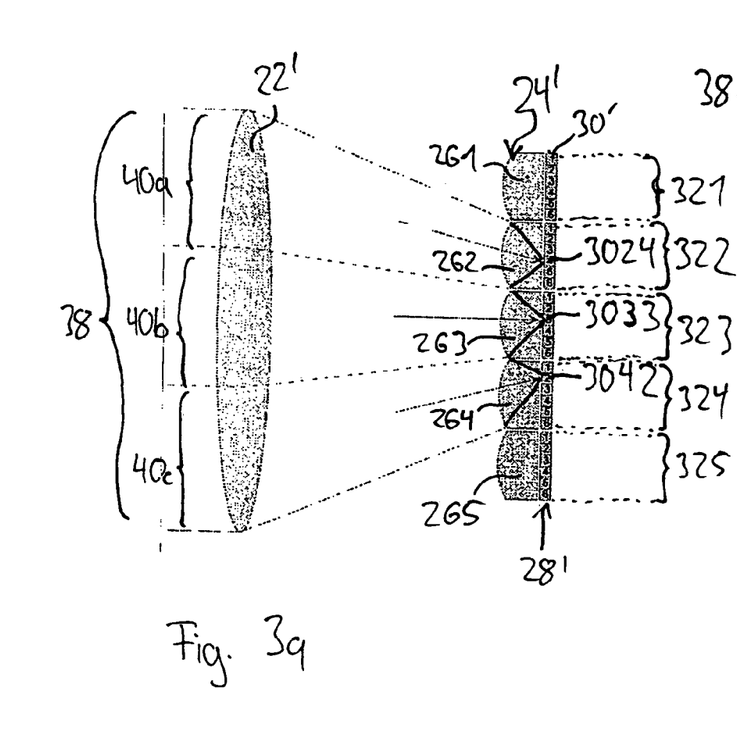
FIGS. 3a and 3b are schematic part representations of a triangulation light sensor working in accordance with the first method variant.
Figure 3B:
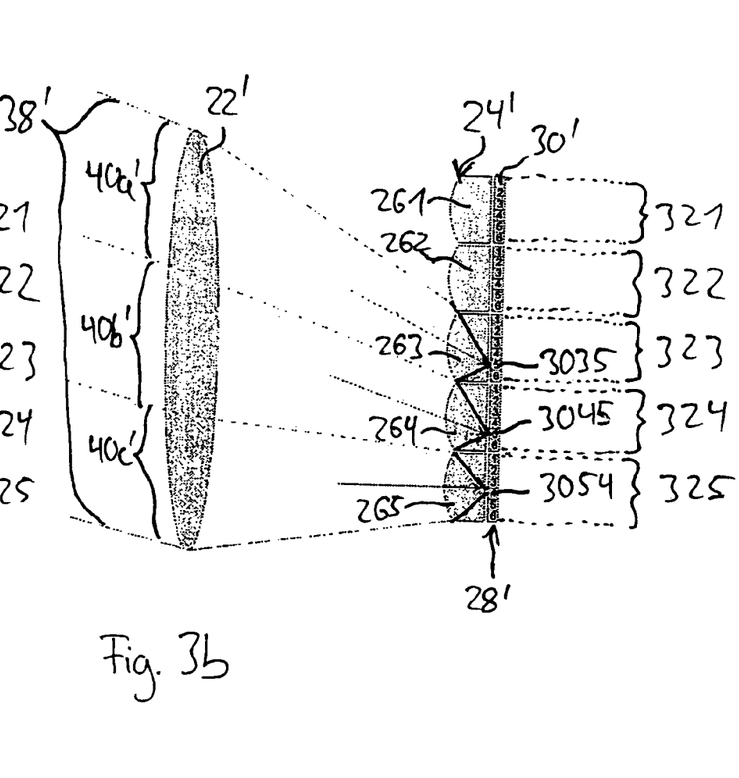

FIGS. 3a and 3b show schematically and sectionally, for the description of an evaluation method in accordance with claims 10 and 18, the receiver components of the triangulation light sensor, with the beam paths shown substantially differing with respect to the position of the focal points of the optical receiver system 22' and of the microlens array 24' as well as the number of the subpixels per macropixel from the beam paths shown in FIGS. 1 and 2 so that a plurality of microlenses or macropixels can also be illuminated with this arrangement. The remaining structure corresponds to FIGS. 1 and 2.

A received bundle of rays 38 reflected or scattered back from an object, not shown, is incident onto an optical receiver system 22' and is bundled by this onto a microlens array 24' which is only shown sectionally and which, unlike in FIGS. 1 and 2, is arranged inside the focal length of the optical receiver system 22'. The microlenses 261 to 265 direct the received bundle of rays 38 onto a receiver 28' which is arranged directly behind the microlens array 24' and is likewise only shown sectionally.

The receiver 28' consists of a pixel array which has a plurality of subpixels 30', with six adjacent subpixels 30' each being combined to form a macropixel 321, 325. The macropixel 321 is associated with the microlens 261 and can receive the beams deflected by it. The macropixels 322 to 325 are correspondingly associated with the other microlenses 262 to 265.

The received bundle of rays 38 in accordance with FIG. 3a is divided into three part bundles 40a, 40b, 40c, with only the beam paths of the beams bounding them being shown. The middle beams of the part bundles 40a to 40c are each indicated by arrows. In FIG. 3a, the part bundle 40a is incident onto the microlens 262, the part bundle 40b onto the microlens 263 and the part bundle 40c onto the microlens 264.

The focal lengths of the optical receiver system 22' and of the microlens array 24' are selected such that the beams reaching a microlens are focused approximately onto a subpixel of the macropixel associated with this microlens. It is understood in this connection that a sharp imaging to precisely one subpixel cannot be achieved for all spacings of a backscattering and/or reflecting object due to a depth of field range predetermined by the optical components.

In FIG. 3b, the angle of incidence, i.e. the triangulation angle, of the received bundles of rays 38' on the optical receiver system 22' is changed with respect to the angle of incidence of the received bundle of rays 38 of FIG. 3a due to a changed spacing of the object, not shown. The part bundles 40a' to 40c' therefore now impact on different microlenses. The part bundle 40a' is incident onto the microlens 263, the part bundle 40b' onto the microlens 264 and the part bundle 40c' onto the microlens 265.

Due to the association of the macropixels 321 to 325 with the microlenses 261 to 265, the change in the angle of incidence of the received bundle of rays 38, 38' caused by the spacing change of the object therefore effects a displacement of the received signal distribution on the receiver 28' related to the macropixels so that a triangulation is possible with respect to the macropixels 321 to 325 by the determination of the position of a maximum and/or focus of the received signal distribution.

As a comparison of FIGS. 3a and 3b shows, the change in the angle of incidence, however, also causes a change or displacement of the received signal distribution within a macropixel associated with a specific part bundle.

If one, for example, considers the macropixel 324, it is acted on by the part bundle 40c in FIG. 3a, with the microlens 264 substantially focusing the part bundle 40c onto the second subpixel 3042. Due to the changed angle of incidence, the part bundle 40b' is now directed onto the macropixel 324 in FIG. 3b, with the associated microlens 264 in this case focusing the part bundle 40b' onto the fifth micropixel 3045 of the macropixel 324.

The change in the angle of incidence of the received bundle of rays 38, 38' therefore effects a displacement of the maximum of the received signal distribution by three subpixel units in the macropixel 324.

A displacement can also be determined e.g. for the macropixel 323. Instead of the subpixel 3033 in accordance with FIG. 3a, the subpixel 3035 two subpixel units away is acted on in FIG. 3b.

It can be seen from this that a spacing between the object and the triangulation light sensor cannot only be determined from the lateral position of the focus of the received signal distribution over the macropixels, but that a spacing determination is also possible within an individual macropixel from the received signal distribution over its subpixels in accordance with the triangulation principle.

A corresponding spacing can thus be associated with each subpixel and be stored in the evaluation unit. The association can take place both by means of corresponding reference measurements and by mean of trigonometric calculations.

The manner will now be explained in the following how a false detection can be avoided using an arrangement in accordance with FIGS. 3a and 3b. An ideal backscattering object 18a, 18b will, as shown in FIG. 1, always fully illuminate the optical receiver system 22' so that all three part bundles 40a to c are covered. In accordance with FIG. 3a, the focus of the received signal distribution will lie on the macropixel 323.

An, in contrast, only reflecting object 18c will only direct the only small light spot generated by the bundle of rays 16 onto a part region of the optical receiver system 22', as shown in FIG. 2. Only the bundle of rays 40c (FIG. 3a), for example, is thus incident onto the microlens array 24' and therefore only acts on the macropixel 324; the other macropixels remain dark or at least considerably darker than the macropixel 324.

A focus determination will therefore now determine the macropixel 324 as the focus of the received signal distribution. The macropixel 324, however, corresponds to the focus of the received signal distribution which is generated at an angle of incidence in accordance with FIG. 3b from a backscattering object located at a different spacing.

A triangulation based solely on the focal points of the received signal value distribution over the macropixels would thus falsely associate an angle of incidence in accordance with FIG. 3b with the part bundle 40c in accordance with FIG. 3a and would therefore result in a false determination of the spacing.

If now, additionally, the received signal distribution over the subpixels within the macropixels is taken into account, the evaluation unit can recognize that, due to the action on the subpixel 3042 in FIG. 3a, the reflecting object 18c must be located at a spacing associated with this subpixel 3042. An object to be associated with a position in accordance with FIG. 3b would namely have had to act on subpixel 3045 instead of subpixel 3042. In accordance with the described method variant, the spacing determination therefore takes place in that first the focus of the received signal distribution is determined over the macropixels and the spacing is then determined in dependence on the received signal distribution over the subpixels of that macropixel with which the focus was previously associated.

The previously described method can be modified to the effect that, for the determination of the object detection signal without taking account of the received signal distribution over the macropixels, the individual subpixels are used directly. Since a specific spacing value is associated with each subpixel on which light beams act and since usually a plurality of subpixels are acted on simultaneously by an object scattering back at a specific spacing, these subpixels can be combined to form a metapixel.

Figure 4A:
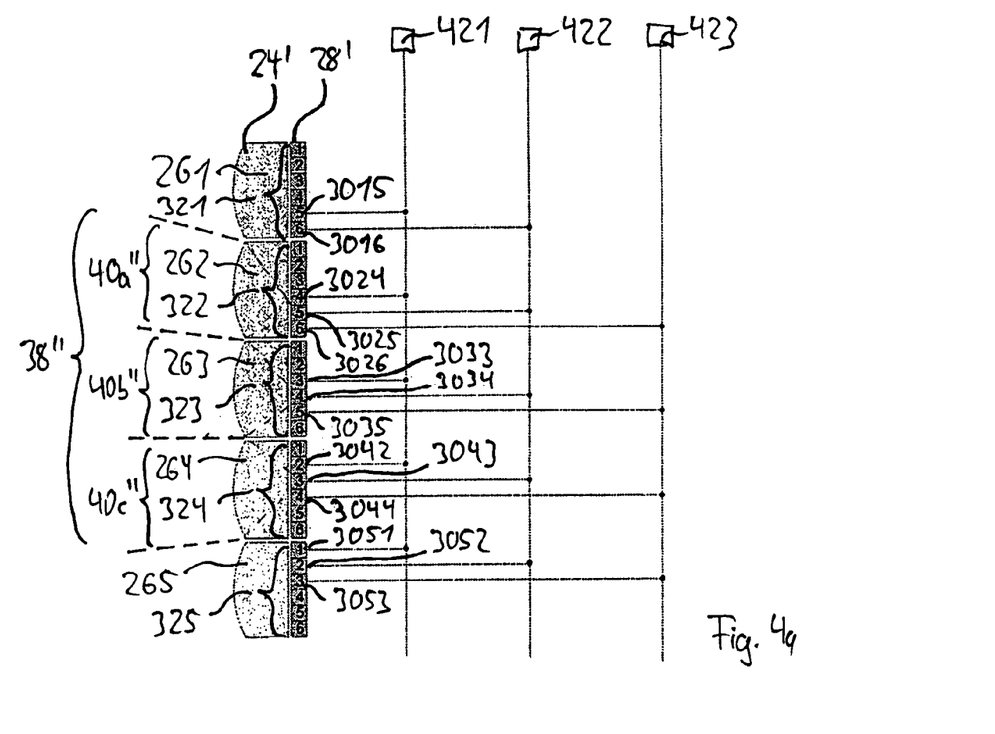
FIGS. 4a and b are schematic circuit diagrams of a triangulation light sensor working in accordance with the first method variant.

An interconnection of this type for a measuring triangulation light sensor is shown schematically in FIG. 4a. It can take place both in the form of a fixed wiring and by a variable association which can be realized, for example, by means of a switch arrangement, but also by a corresponding software encoding.

A bundle of rays 38" which is deflected by an optical receiver system, not shown, and which is scattered back by an object arranged at a specific spacing and likewise not shown here and includes the part bundles 40a" to 40c", is deflected by the microlens array 24' onto the receiver 28'.

The association of the reference numerals with the microlenses 261 to 265, with the macropixels 321 to 325 and with the subpixels corresponds to FIGS. 3a and b. The subpixels 3015, 3024, 3033, 3042 and 3051 are interconnected to form the metapixel 421, the subpixels 3016, 3025, 3034, 3043 and 3052 to form the metapixel 422 and the subpixels 3026, 3035, 3044 and 3053 to form the metapixel 423, with the same spacing value being associated with the subpixels respectively interconnected to form a common metapixel. To maintain clarity, the representation of further metapixels and of the associated interconnections has been dispensed with.

The bundle of rays 38" here acts on the subpixels 3025, 3034 and 3043 which are associated with the metapixel 422. Consequently, on a determination of the received signal distribution over the metapixels, it would be found that the metapixel focus lies at the metapixel 422 so that ultimately the spacing associated with this metapixel is determined.

If now only reflected light rays are transmitted from the object instead of the backscattered light rays, only a small region of the optical receiver system is illuminated so that, for example, only one of the part bundles 40a" to 40c" is incident on the receiver 28'. Since, however, the subpixels 3025, 3034 and 3043 are all interconnected to form the metapixel 422, each of these part bundles 40a" to 40c" will also generate a focus of the received signal distribution over the metapixels at the metapixel 422.

It is furthermore possible not only to interconnect subpixels with which the same spacing is associated, but also subpixels with which spacings disposed within a spacing region are associated. A modification of the circuit of this type of FIG. 4a is shown by way of example in FIG. 4b.

The subpixels associated with the metapixels 421 and 422 in accordance with FIG. 4a as well as further subpixels which are acted on by light beams incident from further obliquely below are associated with the metapixel 424 in FIG. 4b, whereas the subpixels originally associated with the metapixel 425 as well as further subpixels which are acted on by light rays incident further obliquely upwardly are associated with the metapixel 423. A reliable object detection signal can thus be generated by an object located in the spacing region associated with a metapixel independently of its surface properties.

Figure 4B:
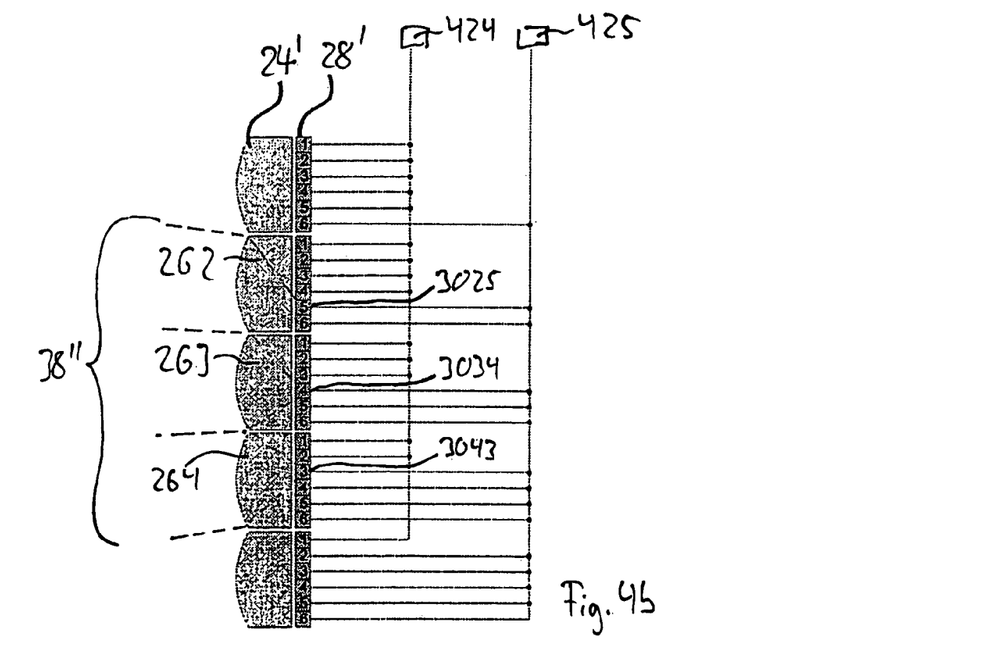

In the embodiment shown in FIG. 4b, only two metapixels are shown beyond this so that such an arrangement can be used for the realization of a switching triangulation light sensor in which objects which are located within the spacing region associated with the metapixel 425 generate a signal "ON", whereas objects which are located within the spacing region associated with the metapixel 424 generate a signal "OFF" which results, for example, in the switching off of a machine.

In FIG. 4b, the bundle of rays 38", which in another respect acts on the same microlenses 261 to 263 and subpixels 3025, 3034 and 3043 as in FIG. 4a, will therefore generate a signal in the metapixel 425 and thus result in an object detection signal "ON".

Due to the arrangement described above, a secure and reliable object detection is ensured both in a measuring and in a switching triangulation light sensor even if only a portion of the optical receiver system is illuminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optoelectronic apparatus for the detection of an object in accordance with the triangulation principle, comprising:

a light source (12);

a receiver arrangement for the detection of light beams (20a, 20b, 36, 38, 38') scattered back and/or reflected by an object (18, 18b, 18c); and an evaluation unit (34) for the output of an object detection signal in dependence on the distance of the object from the receiver arrangement;

wherein the receiver arrangement has an optical receiver system (22) for the deflection of the light beams (20a, 20b, 36, 38, 38') scattered back and/or reflected by the object (18a, 18b, 18c), a microlens array (24', 24) disposed after the optical receiver system (22) as well as a pixel array (28) comprising photodetectors, with a macropixel (32a, 32b, 321-325) being associated with each microlens (26a, 26b, 261-265), wherein each macropixel (32a, 32b, 321-325) has a plurality of subpixels (30, 30'), and wherein the evaluation unit (34) includes a unit for the determination of the received signal distribution over the subpixels (30, 30') within a macropixel (32a, 32b, 321-325); and wherein a corresponding spacing value is associated respectively with one of a subpixel (30, 30') and a position of a characteristic of the received signal distribution over the subpixels of a macropixel which subpixel or position can be acted on by light beams (20a, 20b, 36, 38') scattered back and/or reflected from an object (18a, 18b, 18c) arranged at a predetermined spacing.

2. An optoelectronic apparatus in accordance with claim 1, wherein the pixel array (28, 28') is linear.

3. An optoelectronic apparatus in accordance with claim 1, wherein the pixel array (28, 28') has the form of a two-dimensional array.

4. An optoelectronic apparatus in accordance with claim 1, wherein one of focal lengths and apertures of the optical receiver system (22, 22') and of the microlenses (26a, 26b, 261-265) are selected such that at least the light beams (20a, 20b, 38, 38'), which are scattered back from an object (18a, 18b, 18c) arranged within a detection zone and which fully illuminate the optical receiver system (22, 22'), can be deflected by a plurality of adjacent microlenses (26a, 26b, 261-265) and can each be focused or deflected within the macropixels (32a, 32b, 321-325) associated with these microlenses (26a, 26, 261-265) onto a part region of the macropixel (32a, 32b, 321-325) in particular including a plurality of individual subpixels (30, 30').

5. An optoelectronic apparatus in accordance with claim 1, wherein in each case a plurality of subpixels (30, 30') of the pixel array (28, 28') with which one of the same spacing value and same spacing range is associated are combined to form a metapixel (421-425).

6. An optoelectronic apparatus in accordance with claim 5, wherein a plurality of metapixels (421-425) are provided with which respective different spacing values and/or spacing regions are associated.

7. An optoelectronic apparatus in accordance with claim 5, wherein the subpixels (30, 30') are fixedly interconnected.

8. An optoelectronic apparatus in accordance with claim 5, wherein the subpixels (30, 30') are changeably interconnected.

9. A method for the operation of an apparatus in accordance with claim 1, comprising:
generating the object detection signal in dependence on at least one of the received signal distribution over the macropixels (32a, 32b, 321-325), the received signal distribution over the subpixels (30, 30') of at least one macropixel (32a, 32b, 321-325), and the received signal distribution over the metapixels (421-425).

10. A method in accordance with claim 9, further comprising correcting an object detection signal determined in dependence on the received signal distribution over the macropixels (32a, 32b, 321-325) on the basis of the received signal distribution over the subpixels (30, 30') of at least one macropixel (32a, 32b, 321-325).

11. A method in accordance with claim 9, further comprising correcting an object detection signal determined in dependence on the received signal distribution over the macropixels (32a, 32b, 321-325) on the basis of the received signal distribution over the metapixels (421-425).

12. A method in accordance with claim 11, wherein the object detection signal is only generated in dependence on the received signal distribution over a plurality of metapixels (421-425) used for the object detection.

13. A method in accordance with claim 9, wherein the object detection signal is generated in dependence on the position of a characteristic of the received signal distribution.

14. A method in accordance with claim 9, wherein the object detection signal is generated as a binary output signal on the basis of an object (18a, 18b, 18c) located within a predetermined scanning range.

15. A method in accordance with claim 14, wherein the binary output signal is a function of the position of a characteristic of the received signal distribution over the metapixels (421-425).

16. A method in accordance with claim 14, wherein two spacings complementary to one another are each associated with one of two metapixels (421-425), and wherein the binary output signal adopts a state in dependence on the respective metapixel (421-425) acted on.

17. A method in accordance with claim 9, wherein the object detection signal is generated as an analog and/or digital spacing signal, which is a measure for the spacing of the object (18a, 18b, 18c) from the receiver arrangement and/or from the light source (12) and is a function of the position of a characteristic of the received signal distribution.

18. A method for the operation of an apparatus in accordance with claim 1, comprising:
using the received signals delivered by a macropixel (32a, 32b, 321-325) for the object detection when the subpixels (30, 30') of the respective macropixel (32a, 32b, 321-325) have a substantially symmetrical signal distribution; and
not using the received signals delivered by a macropixel (32a, 32b, 321-325) for the object detection when the subpixels (30, 30') of the respective macropixel (32a, 32b, 321-325) have a substantially asymmetric signal distribution.

19. A method in accordance with claim 18, further comprising using the received signals delivered by a macropixel (32a, 32b, 321-325) for the object detection only after carrying out a correction step.

20. A method in accordance with claim 19, wherein the object detection signal is generated as a binary output signal on the basis of an object (18a, 18b, 18c) located within a predetermined scanning range, with the output signal being a function of the position of a characteristic of the signal distribution within the pixel array (28, 28').

21. A method in accordance with claim 19, wherein the object detection signal is generated as an analog and/or digital spacing signal on the basis of a detected object, with the magnitude of the spacing signal being a measure for the spacing of the object (18a, 18b, 18c) from at least one of the receiver arrangement and the light source (12) and being a function of the position of a characteristic of the signal distribution within the pixel array (28, 28').

22. A method in accordance with claim 18, wherein the object detection signal is determined on the basis of a received signal distribution over a plurality of macropixels (32a, 32b, 321-325) used for the object detection, with a signal of a respective macropixel (32a, 32b, 321-325) being determined by sum formation over its subpixels (30, 30').

23. A method in accordance with claim 18, wherein the subject detection signal is generated in dependence on the position of a characteristic of the received signal distribution within the pixel array (28, 28') determined via a plurality of macropixels (32a, 32b, 321-325) used for the object detection.

24. A method in accordance with claim 18, wherein the object detection signal, during the recognition of at least one macropixel (32a, 32b, 321-325) with a substantially asymmetric signal distribution over the subpixels (30, 30'), maintains its last value directly prior to the recognition.

25. A method in accordance with claim 18, wherein the position of the geometrical focus or of the maximum of the received signal distribution is determined as the position of the characteristic of the received signal distribution.

* * * * *